(12) United States Patent
Hall

(10) Patent No.: US 11,130,264 B2
(45) Date of Patent: Sep. 28, 2021

(54) LABEL HANDLING SYSTEM IN AN IN MOULD LABELLING MACHINE

(71) Applicant: ROLLQUETT PATENT AB, Bromma (SE)

(72) Inventor: Leif Hall, Bromma (SE)

(73) Assignee: ROLLQUETT PATENT AB, Bromma (SE)

( * ) Notice: Subject to any disclaimer, the term of this patent is extended or adjusted under 35 U.S.C. 154(b) by 0 days.

(21) Appl. No.: 15/328,283

(22) PCT Filed: Jul. 31, 2015

(86) PCT No.: PCT/SE2015/050842
§ 371 (c)(1),
(2) Date: Jan. 23, 2017

(87) PCT Pub. No.: WO2016/024898
PCT Pub. Date: Feb. 18, 2016

(65) Prior Publication Data
US 2017/0210044 A1 Jul. 27, 2017

(30) Foreign Application Priority Data
Aug. 11, 2014 (SE) .................................... 1450931-9

(51) Int. Cl.
*B29C 45/14* (2006.01)
*B29C 49/24* (2006.01)

(52) U.S. Cl.
CPC .... *B29C 45/14008* (2013.01); *B29C 49/2408* (2013.01); *B29C 2045/1404* (2013.01);
(Continued)

(58) Field of Classification Search
CPC ...... B29C 45/14008; B29C 2045/1404; B29C 2045/14918; B29C 2045/14926;
(Continued)

(56) References Cited

U.S. PATENT DOCUMENTS 4,604,026 A * 8/1986 Barrett ................. B25J 15/0616
414/728
5,032,344 A * 7/1991 Kaminski ........... B29C 49/2408
156/521
(Continued)

FOREIGN PATENT DOCUMENTS

EP 1745911 1/2007
EP 1914059 4/2008
(Continued)

OTHER PUBLICATIONS

Kato, Kazuhiko, "Machine translation of WO 2015052783", Espacenet.com, Translated Feb. 11, 2020. (Year: 2020).*
(Continued)

*Primary Examiner* — Timothy Kennedy
*Assistant Examiner* — Sonny V Nguyen
(74) *Attorney, Agent, or Firm* — Tucker Ellis LLP

(57) ABSTRACT

A transfer device with unrolling device, intended for providing a label handling system in an IML machine (In Mould Labelling) with IML labels. The transfer device comprises at least four holders, which are movable between a first and a second position, wherein the first position has a first predetermined relationship between the four or several holders regarding the distance in the X-direction. The holders are intended for retrieval of IML labels from the unrolling device, which comprises a label web, the length of which extends in the Y-direction, with partially stamped out labels, connected to the web with micro connections. The second position has a second predetermined relationship between the four or several holders regarding distance in the X-direction. The holders are intended to deliver the IML labels to the label handling system. The unrolling device comprises adjustment means to make possible the retrieval of labels in the Y-direction, so that the distance in the Y-direction between delivered labels has a different distance in the
(Continued)

Y-direction than between two adjacent labels in the web. Further, a method of providing an IML machine with IML labels.

16 Claims, 8 Drawing Sheets

(52) U.S. Cl.
CPC ............... *B29C 2045/14918* (2013.01); *B29C 2049/2412* (2013.01); *B29K 2995/0003* (2013.01)

(58) Field of Classification Search
CPC .......... B29C 49/2408; B29C 2049/241; B29C 2049/2443; B29C 2049/2449; B29C 2049/2454; B29C 2049/2458; B29C 2049/246; B29C 2049/2464; B29C 2049/2472; B29C 2049/2479; B29C 2049/2485; B29C 2049/2487; B29C 45/42; B29C 45/14024; B29C 45/14262; B29C 45/1679; B29C 2049/2437; B29C 2045/1427; B29C 2045/14278; B29C 37/0025; B29C 2045/2653; B26D 2007/082; B26D 7/14
USPC .................................... 425/121, 126.1, 126.2
See application file for complete search history.

(56) References Cited

U.S. PATENT DOCUMENTS

| | | | | |
|---|---|---|---|---|
| 5,082,439 A * | 1/1992 | Kaminski | ........... | B29C 49/2408 156/DIG. 31 |
| 5,198,247 A * | 3/1993 | Bartimes | ............. | B29C 49/2408 156/DIG. 31 |
| 5,344,305 A * | 9/1994 | McKillip | ............ | B29C 49/2408 264/509 |
| 5,908,590 A * | 6/1999 | Yoshimi | ................ | B29C 31/008 264/153 |
| 5,919,414 A * | 7/1999 | Dobler | ................ | B29C 37/0007 264/155 |
| 5,945,059 A * | 8/1999 | Atake | ................. | B29C 45/1418 264/267 |
| 6,497,567 B1 * | 12/2002 | Eschenfelder | .... | B29C 45/14016 425/127 |
| 2003/0152661 A1* | 8/2003 | Yu | .......................... | B25J 9/1045 425/436 RM |
| 2006/0176180 A1* | 8/2006 | Freund | ................ | B29C 37/0032 340/572.8 |
| 2007/0098838 A1* | 5/2007 | Dobler | ................ | B29C 45/1769 425/556 |
| 2008/0143017 A1* | 6/2008 | Hoogland | ......... | B29C 45/14024 264/259 |
| 2009/0194922 A1* | 8/2009 | Lin | ...................... | B25J 15/0052 269/55 |

FOREIGN PATENT DOCUMENTS

| | | | | | |
|---|---|---|---|---|---|
| JP | | 01234218 | A * | 9/1989 | ....... B29C 45/14024 |
| JP | | 40397522 | | 4/1991 | |
| JP | | 408132520 | | 5/1996 | |
| JP | | 2010162763 | A * | 7/2010 | ....... B29C 45/14008 |
| WO | WO-9605040 | A1 * | 2/1996 | ....... B29C 45/14008 |
| WO | | 0236320 | | 5/2002 | |
| WO | | 2006050956 | | 5/2006 | |
| WO | | 2007091290 | | 8/2007 | |
| WO | WO-2010006811 | A2 * | 1/2010 | ........... B65D 25/205 |
| WO | WO-2015052783 | A1 * | 4/2015 | ............. B21D 28/26 |

OTHER PUBLICATIONS

Yamamoto, Koichi, "Machine translation of JP 2010162763," Espacenet. com, Translate Feb. 11, 2020. (Year: 2020).*
PCT/SE2015/050842 Written Opinion of the International Searching Authority and the International Search Report dated Oct. 23, 2015.

\* cited by examiner

LABEL HANDLING SYSTEM IN AN IN MOULD LABELLING MACHINE

RELATED APPLICATION DATA

This application is a national phase application of International Application No. PCT/SE2015/050842 filed Jul. 31, 2015, published in the English language, which claims priority to SE 1450931-9 filed Aug. 11, 2014, which are hereby incorporated herein by reference.

TECHNICAL FIELD

The present invention relates to the In Mould Labelling, IML, technology used in the manufacture of injection moulded or blow moulded products made of plastic.

BACKGROUND

In the manufacture of injection moulded and blow moulded articles, mostly packages, a technology commonly known as IML, In Mould Labelling is used. The idea behind this technology is to place a label inside the cavity, in which the package is moulded, before the cavity is closed and the plastic is injected. The most common method is to charge the label with static electricity in order to make it adhere to the surface of the tool. When the tool is opened the label is moulded into the surface layer of the plastic object.

Labels for IML are taken from a stack of individual separate labels to be transferred to a label handling system, which subsequently introduces the label into the cavity in order to let the label adhere to the interior of the cavity due to the electrostatic charge.

IML labels are manufactured mainly using two alternative technologies. According to one technology the labels are printed in a printing press working with a continuous web, wherein the comprised label material is in a roll. At first, the web runs through the printing unit of the printing press, whereupon the labels are stamped out in a subsequent stamping device. Residual material is wound up or is milled, while the stamped out labels are transferred onto a belt in order to be retrieved into bundles, which are provided with banderoles and are packed for further transport to an injection moulding plant.

The other method comprises printing of the labels in a printing press with sheet feeding. In this case, the starting material is comprised of sheets fed through the printing press for printing. Bundles of printed sheets are cut down to smaller elements, which are placed in a specific stamping device, wherein bundles are compacted by a stamping tool having a form, which is identical to the form of the completed label. The stamped out labels are then provided with banderoles in the same way as is described above.

In U.S. Pat. No. 5,919,414 a further contemplated way for the manufacture of labels for IML is described. In this case printed labels will arrive on a web in the vicinity of the injection moulding plant and are stamped out successively when they are to be fed into the injection moulding plant.

The problems of the prior art: Since the most common label material is plastic film, which often is laminated in different layers, static electricity is a major problem during the production of labels. Individual, stamped out labels having a tendency to become charged with static electricity very easily, are very difficult to handle in an automated production line. In order to be able handle the labels an anti-static agent has to be used by the printing office, which is mixed into the printing ink, or to apply anti-static lacquer on top of the printed graphics. Despite this method of eliminating static electricity in the label production the printing machines have to be run at reduced speed in order to be able to handle the labels. The difficulties of handling the individual labels also make it necessary to perform much of the work manually. In order to reduce the difficulties, on behalf of the printing process, the intent is to reduce the static electricity as much as possible. However, in the injection moulding, static electricity in the labels is needed in order for them to adhere to the moulding tools. Too much anti-static agent might make the labels useless, since they will not adhere in the tools.

Another problem in the injection moulding part of the process is curved labels. Laminated label material often have a tendency to curve, printing ink of the label amplifies the curving problem. With curved or wavy labels, difficulties arise when they are to be positioned and separated in order for the label handling system of the injection moulding machine to be able to pick up labels one by one.

A third problem, which arises when using the principle according to U.S. Pat. No. 5,919,414 is that a complete stamping machine, is required, which demands its specific handling, vibration dampening and which demands that very large forces are used while at the same time the precision has to be very high so that the labels are correctly stamped out. Further, the stamping is intermittent in order to suit the injection moulding cycle wherefore the process with a continuously rotating rotational stamp, which is more easy to handle cannot be used, but instead intermittent stamping has to be used. The equipment might vary in temperature after having been run for a while and has to be adjusted, since otherwise the stamping will be defective or the cutting edge of the stamping device might be damaged. The anvil, which shall absorb the force from the stamp, has to be heavily dimensioned. The whole machine has to be very sturdy. In U.S. Pat. No. 5,919,414 the stamping cavities are used for moving the stamped labels along two heavy duty shafts from the stamping to be delivered in the moulds. The requested high stability for the stamping process in in conflict with the speed which is needed in order for this to take place during the short while the mould is open during the injection moulding cycle. The shuttles used today in label handling systems for IML are made of carbon fiber or other light materials in order to have time to quickly and precisely place IML labels in the injection moulding moulds during the short time the mould is open.

There are two main principles for label magazines. One type of magazine works with labels lying horizontally and has a lift device which lifts the bundles of labels to a position wherein the labels can be picked up. These magazines have advantages when the labels are oblong or very large, the disadvantages are difficulties with curved and wavy label materials and in that the injection moulding process has to be interrupted when the magazine is to be replenished.

The other magazine type is magazines which are inclined, often about 15° in relation to the horizontal plane, in such a way that the labels are fed by gravity towards a plane wherein the labels are picked up. In order for the labels not to fall out there are borders along the contours of the labels, which maintain the label in the magazine until the label handling system picks up the label. The advantage with these magazines is that they can be replenished without having to interrupt the injection moulding process, while the drawback is that oblong labels or labels with complex geometries are difficult to handle, large labels are also difficult to handle in this type of magazine.

Examples of prior art in this field are U.S. Pat. Nos. 5,067,890 and 5,017,125. Also U.S. Pat. No. 5,082,439 shows prior art technology in this field, wherein stamped labels are moved with a label handling system to a respective mould.

The above described difficulties are the reason for why some materials, which for other reasons would be suitable for use, cannot be used for IML labels. As examples might be mentioned label materials with different kinds of barrier properties or label materials of thinner and more inexpensive qualities.

SUMMARY OF THE INVENTION

One object of the present invention is to make it possible in an effective way to provide IML labels to a label handling system. A further object is to make it easier to use other materials, which today are too difficult to handle, for IML labels. According to the invention a transfer device with an unrolling device is provided, intended to supply a label handling system in an IML machine (In Mould Labelling) with IML labels. The transfer device comprises at least four holders, which are movable between a first and a second position, wherein the first position has a first predetermined relationship between the four or more holders regarding the distance in the X-direction and the Y-direction. The holders are intended to retrieve IML labels from the unrolling device, which comprises a label web, the longitudinal direction of which is in the Y-direction, with partially stamped out labels, which labels are connected to the web by micro connections. The second position has a second predetermined relationship between the four or several holders with respect to distance in the X-direction and the Y-direction. The holders are intended to deliver the IML labels to the label handling system. The unrolling device comprises adjustment means making it possible to retrieve labels in the Y-direction, so that the distance in the Y-direction between delivered labels is different from the distance in the Y-direction between two adjacent labels in the web.

In one embodiment of the transfer device with unrolling device the distance between delivered labels in the second position in the Y-direction is bigger than the distance in the Y-direction between two adjacent labels in the web.

In another embodiment, the distance between delivered labels in the second position in the X-direction, across the longitudinal direction of the label web, is bigger than the distance in the X-direction between labels retrieved in the first position. Alternatively, it might be desirable that the distance between delivered labels in the second position in the X-direction, across the longitudinal direction of the label web, is smaller than the distance in the X-direction between labels retrieved in the first position.

Preferably, the holders are arranged at rotary shafts, which can rotate 180 degrees, in the transfer device with unrolling device.

In one embodiment, the holders are arranged closer to each other in relation to the mutual distance between the rotary shafts in the first position for retrieval, wherein the holders will be at a bigger distance from each other compared to the mutual distance between the rotary shafts in the second position.

In an alternative embodiment, the holders are arranged further away from each other with respect to the mutual distance between the rotary shafts in the first position for retrieval, wherein the holders will be closer to each other with respect to the mutual distance between the rotary shafts in the second position.

Preferably the unrolling device has two or several exposure surfaces between each of which an adjustment roll as adjustment means is adjustably mounted for adjustment of the position of the labels in longitudinal direction for each exposure surface.

According to one embodiment, an anvil is arranged on the opposite side of the label web in relation to the holders, close to the label web. Preferably the anvil has a recess for each label to be retrieved by the holders. It is also desirable that the holders are arranged displaceable, so that they can be displaced towards the label web in the first position for pressing out the labels from the web against the anvil.

The invention also relates to a method of providing an IML machine with IML labels.

According to the present invention labels for IML are retrieved by a transfer device with unrolling device from a, preferably intermittently running, web comprising labels, which adheres to the web with the aid of attachment bridges, so called micro connections, wherein the device preferably presses out each label against an anvil in order to loosen the label from the web and subsequently introduces the label into the mould in order for the label to electrostatically adhere to the inside of the mould.

IML labels shall be printed in a printing press working with a continuous web, but instead of separating the labels from the web the labels shall be stamped with so called micro connections. Micro connections is a small interruption of the cutting edge of the punch, resulting in that the stamped label loosely remains connected to the surrounding material, whereupon the material with the stamped labels again is rolled up onto a roll.

In the injection moulding plant, instead of a magazine making the labels accessible for the label handling system, a transfer device with unrolling device, which rolls off the labels from a roll and exposes them in such a position that the transfer device can separate the labels from their micro connections and by the transfer device they can then be delivered to the label handling system and be placed into the tool. The unrolling device can be equipped with a collecting device in order to handle the residual label material, either by rolling it up onto a roll, to mill it or to compress the material.

The advantages obtained are that printing and stamping can be run with higher velocity than was possible before. The need of mixing antistatic agents into the printing ink for the labels or to use antistatic lacquer is substantially reduced. Much manual handling with the application of banderols and packages is no longer needed. Label material qualities, which cannot be used with today's technology, can be used. Problems with curved labels will be reduced to a large extent. Complex label geometries will be easier to handle.

SHORT SUMMARY OF THE INVENTION

The invention will now be described, as examples, with reference to the accompanying drawings, in which.

DESCRIPTION OF EMBODIMENTS

Figure 1:
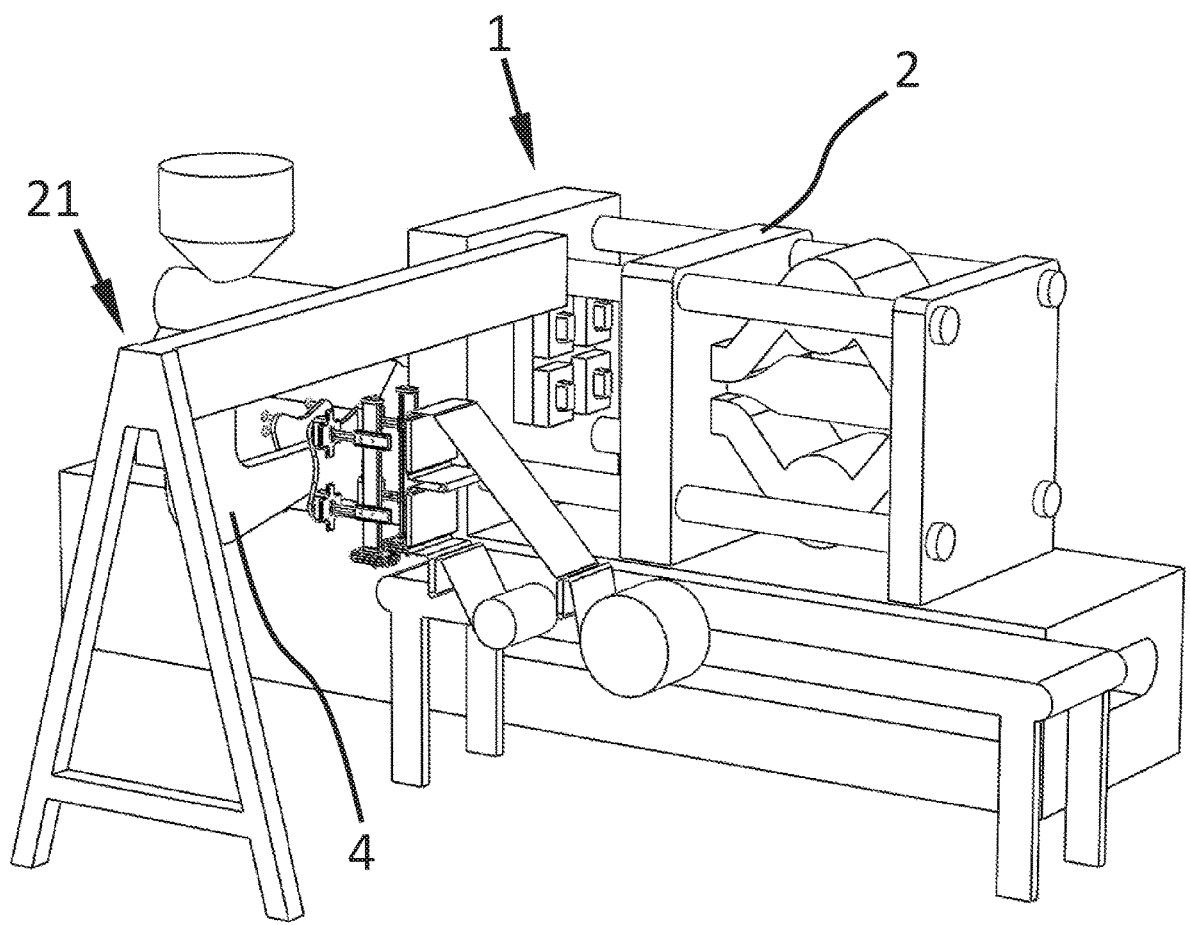
FIG. 1 shows an injection moulding machine and an IML machine of side entry type having an inventive transfer device with unrolling device, wherein a shuttle carrying dummies for inserting of labels in the mould is in a retrieving position.

A detailed description of embodiments of the present invention will follow below. In FIG. 1 is shown an overview of an injection moulding machine 1 with an IML machine 21 of side entry type connected to the injection moulding unit. The injection moulding unit has a movable mould table 2, which can be displaced between an open and a closed position. The machine cycle comprises four parts: open when IML labels are introduced into the mould; closing; closed when the product itself is manufactured by injection moulding; and opening. When the mould has been opened completely the injection moulded products are taken out. FIG. 1 shows the injection moulding unit in open position.

Figure 2:
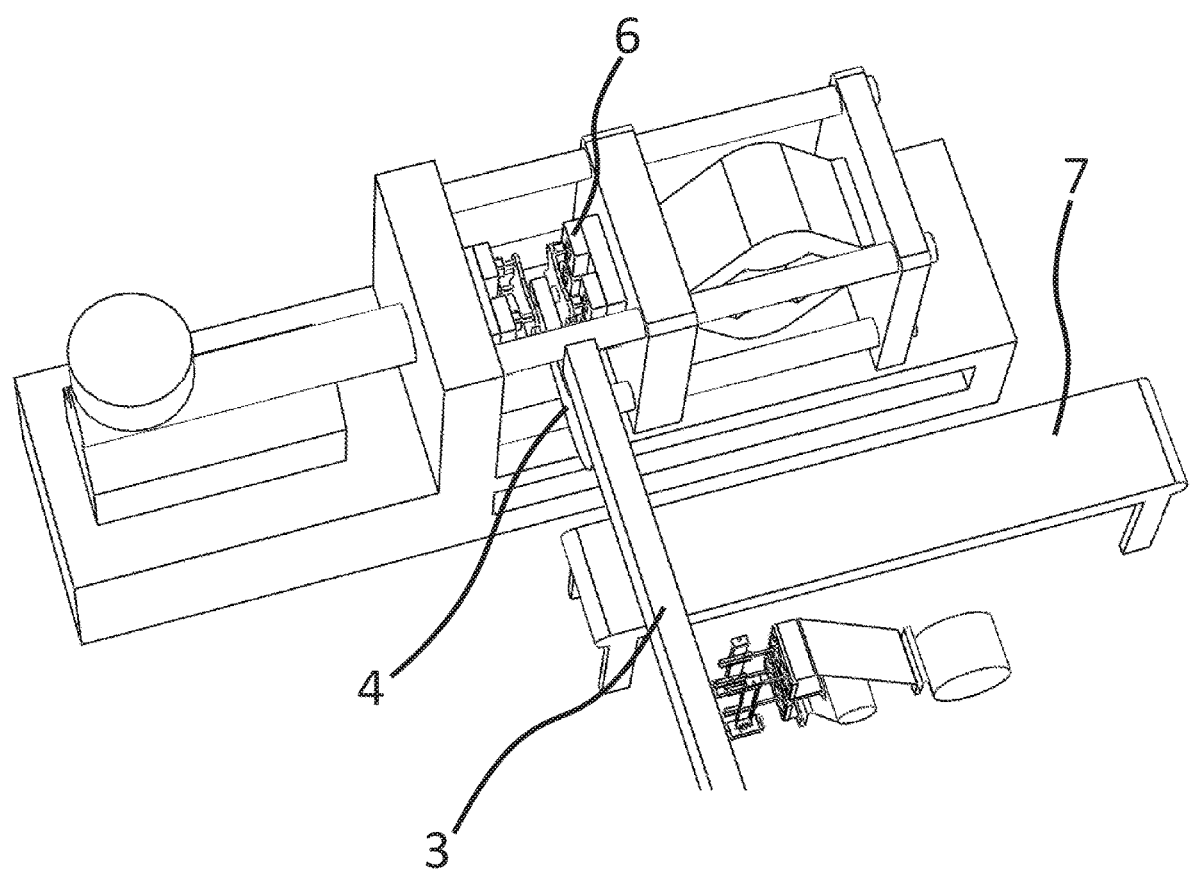
FIG. 2 shows holders in a first position for retrieving labels from a web of pre-stamped labels.

The IML machine is comprised of a transverse traverse 3, shown in FIG. 2. In the traverse, there is a movably arranged shuttle 4. The shuttle is provided with one dummy 5 (see FIG. 5) for each cavity 6 in the injection moulding tool. In the open position the shuttle 4 runs into the opening between the mould parts and each dummy 5 retrieves simultaneously the produced packages, whereupon the shuttle 4 runs along the traverse 3 to an unloading table 7 or transport belt, onto which the packages are delivered. Subsequently IML labels 8 (see FIG. 5) are retrieved from an inventive transfer device 10 with unrolling device 11. The transfer device 10 provides each dummy 5 with an IML label 8. Thereafter the shuttle 4 runs in short time into the opening between the open mould parts leaving the labels in the respective cavity 6. See FIG. 2. Thereafter the shuttle 4 leaves the mould and the mould is closed. Then the products are injection moulded with the moulded-in label. It is conceivable that there is also a transfer means, which then is comprised in the label handling system between the transfer device and the shuttle 4.

Now one embodiment of the transfer device 10 with unrolling device 11 will be described more in detail through FIGS. 3-8, wherein the process and the function and the parts involved therein are shown in the sequence from retrieving IML labels from a web of pre-stamped labels to the delivery of the IML labels to each dummy.

Figure 3:
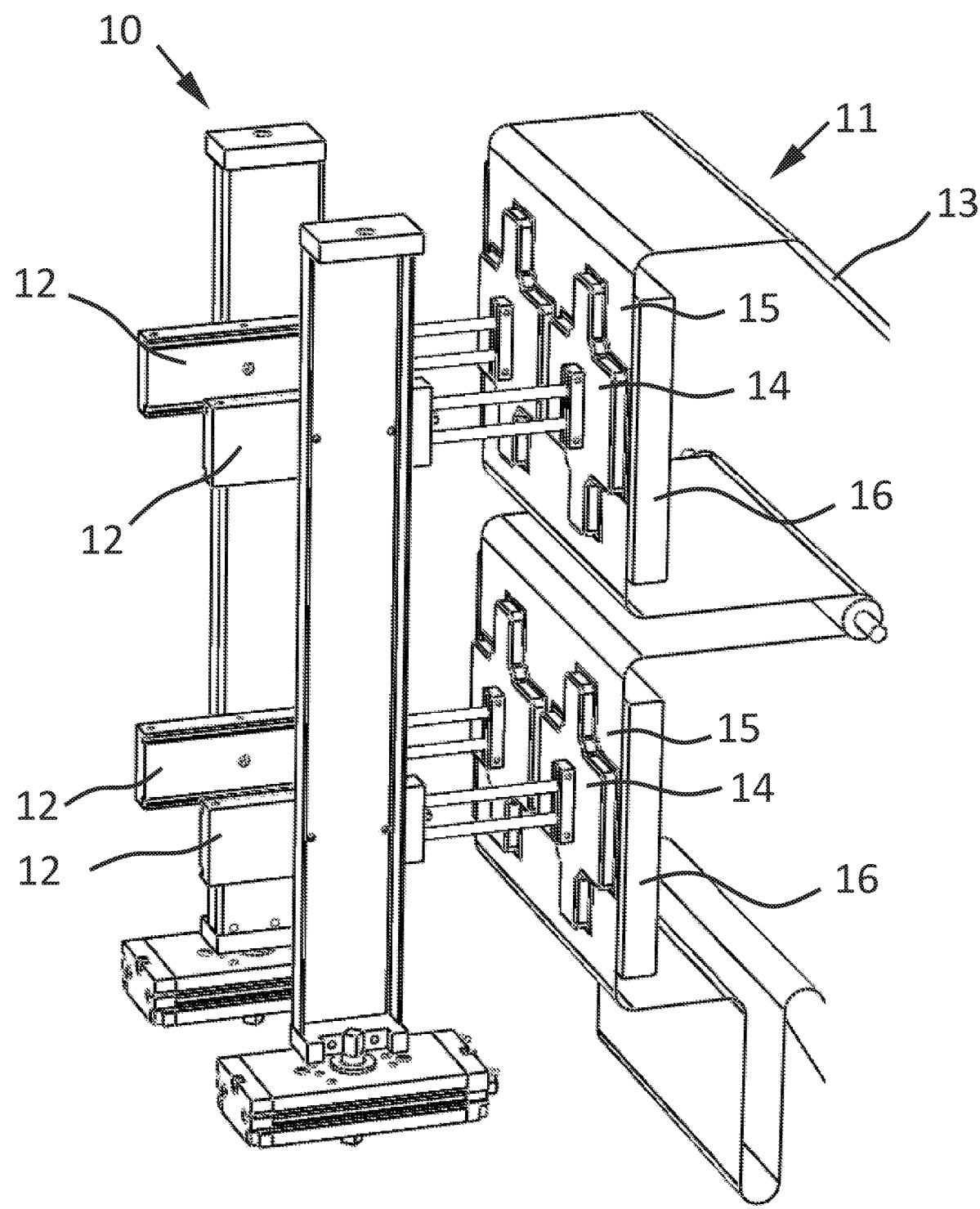
FIG. 3 shows holders in a first position for retrieving labels from a web having pre-stamped labels.

FIG. 3 shows holders 12, in this embodiment four of them, in order to be able to provide a four-cavity mould with IML labels. Other possible embodiments can for example be six-cavity or eight-cavity moulds. The holders 12 can be extended by extension so that they reach the unrolling device 11 and an IML label web 13. The holders 12 have plates 14 corresponding to the form of the IML labels 8, which shall be retrieved from the web 13.

Figure 4:
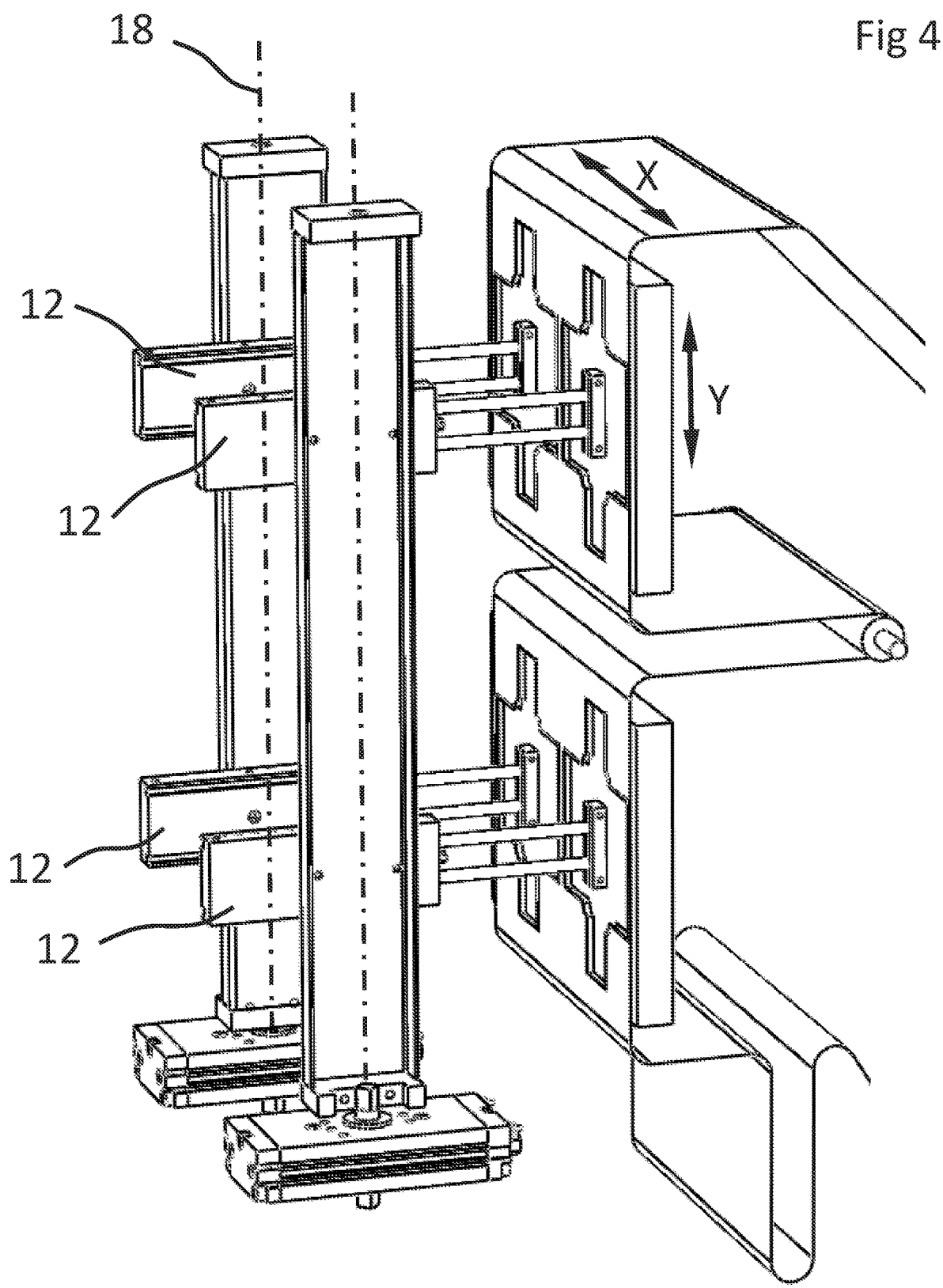
FIG. 4 shows the holders in an advanced position where they press the labels loose from the web.

The IML labels 8 are pressed out of the web, preferably in such a way that micro connections holding the pre-stamped labels are broken. The unrolling device 11 has two or several exposure surfaces 15. On the opposite side of the web 13 in relation to the transfer device 10 there are one or several anvils 16. Preferably the anvil 16 has recesses 20 (see FIG. 8) with the form of the labels. In FIG. 4 the holders 12 are shown in advanced position so that the plates 14 press the labels 8 loose from the web 13 against the recess borders of the anvil 16.

Figure 5:
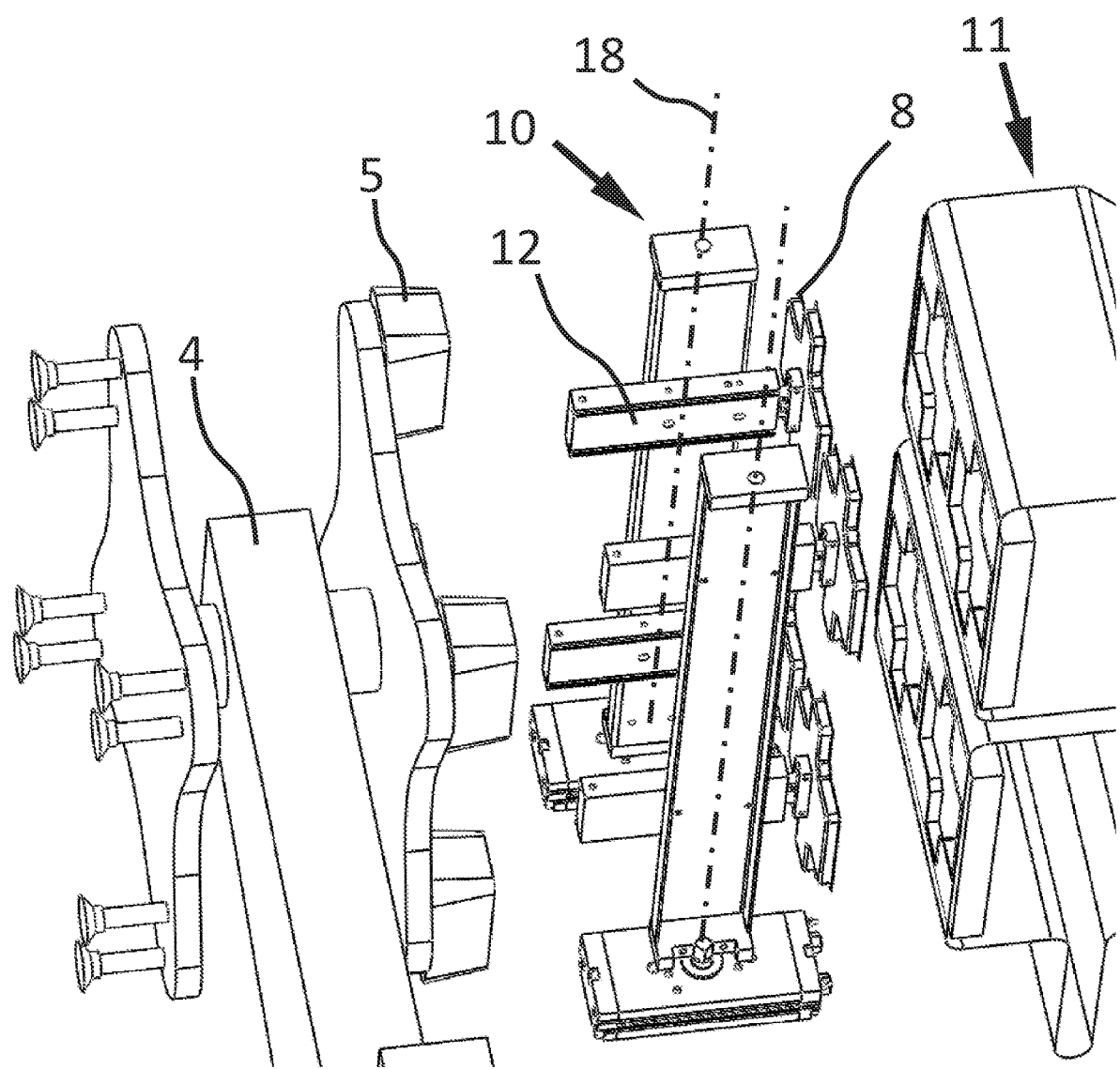
FIG. 5 shows the holders retracted with the labels trapped on the holders.

In FIG. 5 the holders 12 are in a retracted position and the labels 8 are held by the holders 12. In the web the holes from the labels are seen. In the figure the shuttle 4 with its dummies 5 is also seen.

The IML labels 8 are held at the holders 12 preferably using sub-pressure. Now the labels 8 are supposed to be delivered to the shuttle 4 and each dummy 5. One way, which is shown in this embodiment, is to turn the holders around a rotary shaft 18, at which at least one holder 12 is arranged. Preferably the holders are rotated 180 degrees from a first position for retrieving labels to a second position for delivering labels. Each holder 12 might have its own rotary shaft 18, which is arranged orthogonally in relation to the extension of the holder 12. In the embodiment shown, however, two holders 12 are arranged at each rotary shaft 18.

Figure 6:
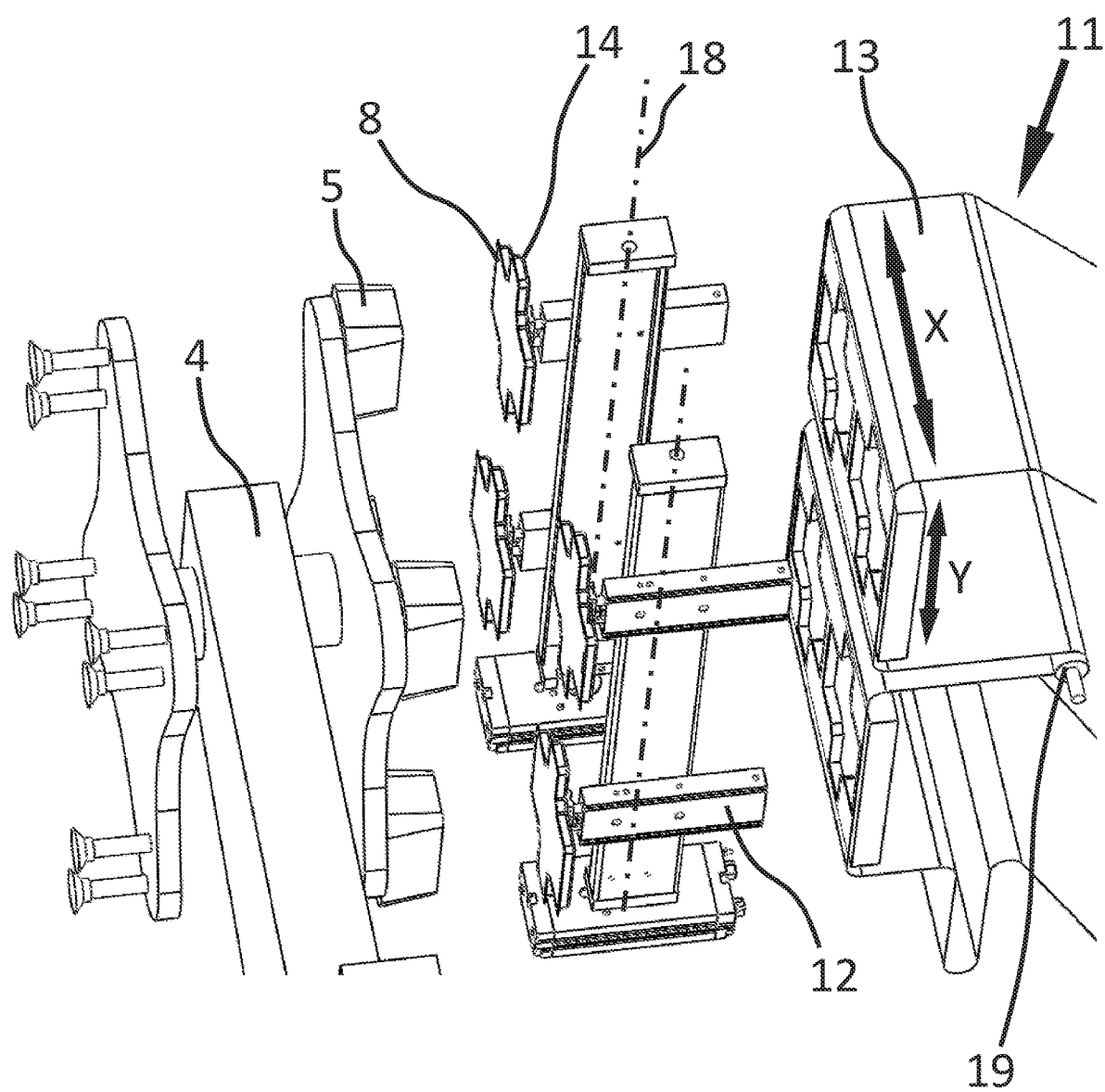
FIG. 6 shows the holders in a second position for delivering the labels to the respective dummy on the shuttle.

In FIG. 6 the holders 12 have been turned around the rotary shafts 18 and the labels 8 are held at the holders 12. In the web 13 the holes after the labels can be seen. The holders 12 are then extended up to each dummy 5, whereby a delivery of the IML labels takes place between the holders 12 with each plate 14 to each dummy 5. A sub-pressure is applied onto each dummy 5 in order to maintain the labels, and subsequently the sub-pressure in the plates 14 is released.

In order to save label material the labels 8 are normally stamped as close to each other as possible in the web 13. On the other hand the cavities 6 in the mould are normally arranged with a bigger space between each other in order for the production to be well functioning. Therefor the labels 8 need to be separated from each other in the Y-direction, i.e. in the longitudinal extension of the web 13. An embodiment of the unrolling device 11 which can solve this problem will be described in detail below. Also in the X-direction, across the longitudinal extension of the web 13, it is in the normal case desirable to increase the distance between the labels 8 in order to make it possible to retrieve them by each dummy 5 of the shuttle 4. However, one has to keep in mind that there may also be embodiments where it instead is desirable to reduce the distance between the labels 8 from the retrieving position, the first position, to the delivery position, the second position.

The unrolling device 11 is provided with an adjustment roll 19, which functions as an adjustment means for setting the distances in the Y-direction between the labels 8 on said two or several exposure surfaces 15. By moving the adjustment roll 19 closer or further from the exposure surfaces or more specifically increase the length of the web between the exposure surfaces or reduce the length of the web, a fine adjustment of the distance in the Y-direction between the labels can be made. As the man skilled in the art understands, the unrolling device 11 comprises several rolls and deflecting means for guiding of the web 13 into the desired position, which is indicated by curves in the web. This can be achieved in different desirable ways by the man skilled in the art in each specific situation. A preferred positioning of the web 13 is shown in the figures.

As the man skilled in the art understands, it is easy to add, e.g in the Y-direction, further exposure surface and anvil and corresponding holders for moulds having more cavities than four.

The transfer device 10 can also be designed so that it increases or decreases the distance in the X-direction between the labels from the first position, retrieval, to the second position, delivery. In the figures the desired embodiment is shown. In the first position, shown in the FIGS. 3-5, the holders 12 are turned towards the web 13 with the plates 14 directed towards the web 13. In the embodiment shown, a movement for increasing the distance has been accomplished in a way which is to be described. There are of course many other ways of moving the labels further away from or closer to each other in the X-direction between retrieval and delivery.

Figure 7:
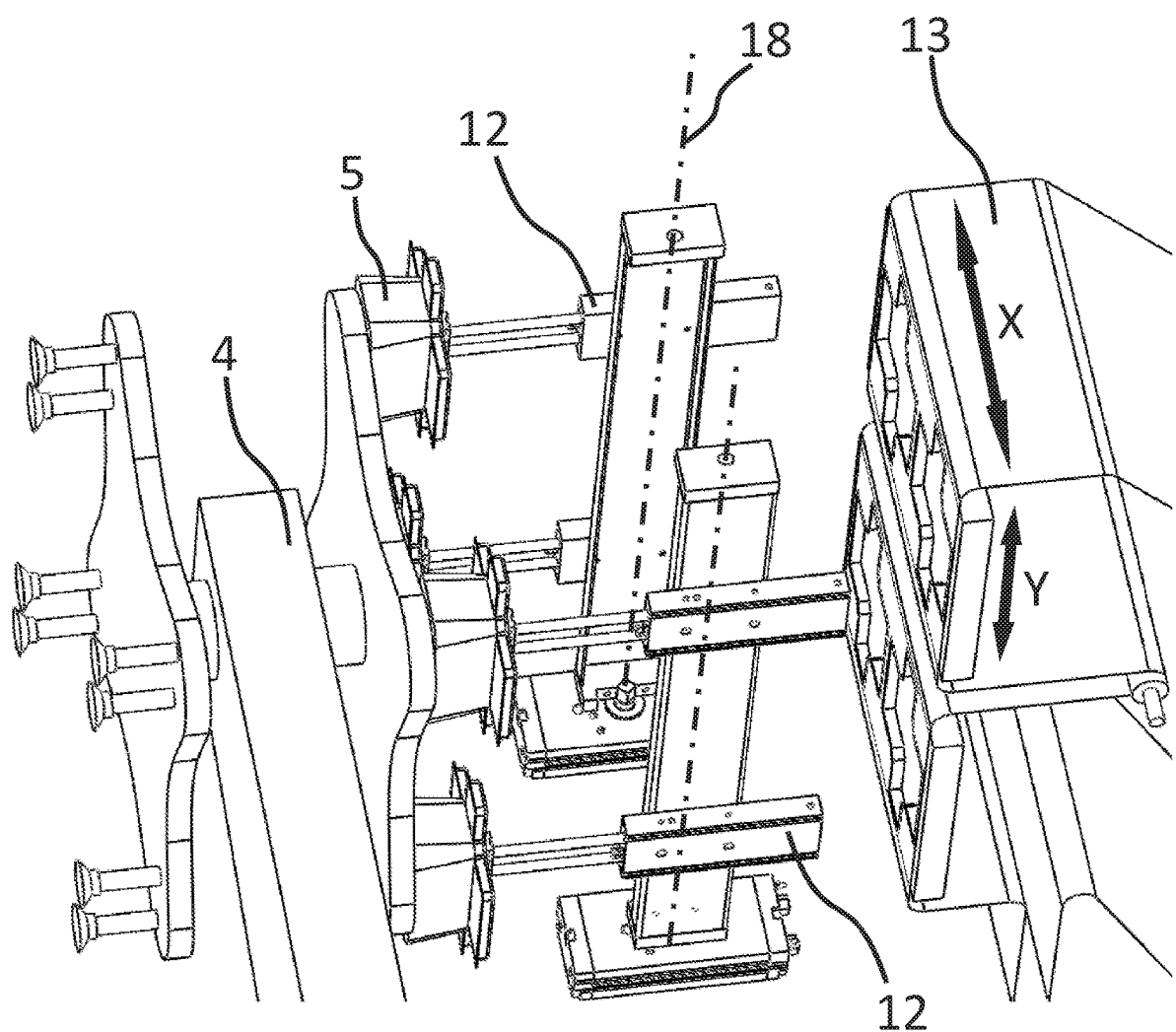
FIG. 7 shows the holders in an advanced position at the moment of delivering labels from the holders to each dummy.
Figure 8:
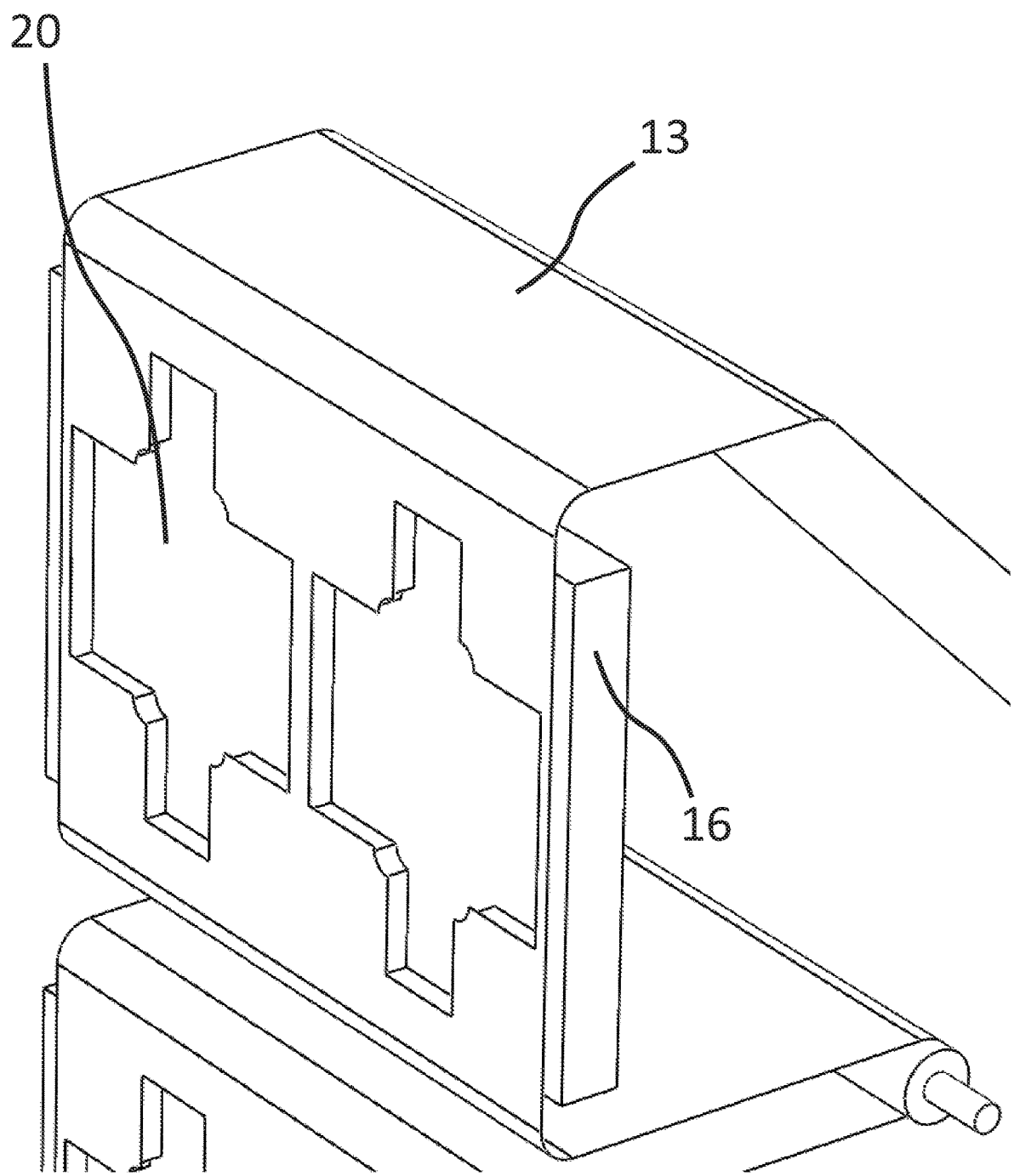
FIG. 8 shows an anvil with recesses in the unrolling device.

The holders 12 are arranged at the rotary shafts 18 in such a way, that in the first position the holders 12 are positioned closer to each other than the rotary shafts are in the X-direction. Then, when the holders 12 rotate 180 degrees to the second position, they will be positioned further away from each other than the mutual distance between the rotary shafts 18 in the X-direction. FIGS. 6 and 7 show the second position.

An easy way to change to an embodiment which instead reduces the distance between the labels from the first position, retrieval, to the second position, delivery, is to arrange the holders 12 at a larger distance in the X-direction than the mutual distance between the rotary shafts 18 in the first position, whereby the holders will end up closer to each other in the second position than the mutual distance between the rotary shafts 18 in the X-direction.

The invention claimed is:

1. A transfer device with an unrolling device intended for providing a label handling system, including an in mould labelling (IML) machine for an injection moulding unit, with IML labels, wherein the transfer device comprises at least four holders, which are movable between a first position and a second position, whereby the first position has a first predetermined relationship between the at least four holders regarding a first distance in an X-direction relative to one another, and wherein the holders are intended to retrieve the IML labels when in the first position from the unrolling device, which comprises a label web, the length of which extends in a Y-direction, the label web having partially stamped out IML labels, wherein the IML labels are attached to the label web through micro connections, whereby the second position has a second predetermined relationship between the at least four holders regarding a second distance in the X-direction relative to one another, the first distance in the X-direction being different from the second distance in the X-direction, wherein the at least four holders are intended to deliver the IML labels to the label handling system in the second position and in which the unrolling device comprises adjustment means in order to allow retrieval of IML labels in the first position, the adjustment means adjusting distances in the Y-direction so that a retrieval distance in the Y-direction between IML labels in the first position is different from a printing distance in the Y-direction between two adjacent IML labels in the web, and wherein a delivery distance between delivered IML labels in the second position in the Y-direction is bigger than the printing distance in the Y-direction between two adjacent IML labels in the web and is the same as the retrieval distance in the Y-direction between IML labels in the first position.

2. The transfer device with the unrolling device according to claim 1, in which the second distance between delivered IML labels in the second position in the X-direction, across a longitudinal extension of the label web, is bigger than the first distance in the X-direction between IML labels retrieved in the first position.

3. The transfer device with the unrolling device according to claim 1, in which the second distance between delivered IML labels in the second position in the X-direction, across a longitudinal extension of the label web, is smaller than the first distance in the X-direction between IML labels retrieved in the first position.

4. The transfer device with the unrolling device according to claim 1, in which the holders are arranged to rotate 180 degrees around rotary shafts spaced a mutual distance from one another.

5. The transfer device with the unrolling device according to claim 4, in which the holders are arranged closer to each other than the mutual distance between the rotary shafts in the first position for retrieval, whereby the holders will be further away from each other than the mutual distance between the rotary shafts in the second position.

6. The transfer device with the unrolling device according to claim 4, in which the holders are arranged further from each other than the mutual distance between the rotary shafts in the first position for retrieval, whereby the holders will be closer to each other than the mutual distance between the rotary shafts in the second position.

7. The transfer device with the unrolling device according to claim 1, in which the unrolling device has two or more exposure surfaces between which an adjustment roll as the adjustment means is adjustably arranged for adjustment of the position of the IML labels in a longitudinal direction for each exposure surface.

8. The transfer device with the unrolling device according to claim 1, in which an anvil is arranged on an opposite side of the label web in relation to the holders.

9. The transfer device with the unrolling device according to claim 8, in which the anvil has a recess for each of the IML labels to be retrieved by the holders.

10. The transfer device with the unrolling device according to claim 9, in which the holders are displaceably arranged so that they can be displaced towards the label web in the first position for pressing loose the IML labels from the web against the anvil.

11. A method of providing an in mould labelling (IML) machine with IML labels, including using a transfer device with an unrolling device, wherein the transfer device comprises at least four holders, which are movable between a first position and a second position, whereby the first position has a first predetermined relationship between the at least four holders regarding a first distance in an X-direction, and wherein the at least four holders are intended to retrieve the IML labels when in the first position from the unrolling device, which comprises a label web, the length of which extends in a Y-direction, having partially stamped out IML labels, wherein the IML labels are attached to the label web through micro connections, whereby the second position has a second predetermined relationship between the at least four holders regarding a second distance in the X-direction relative to one another, the first distance in the X-direction being different from the second distance in the X-direction, wherein the at least four holders are intended to deliver the IML labels to the label handling system in the second position and in which the unrolling device comprises adjustment means in order to allow retrieval of IML labels in the first position, the adjustment means adjusting distances in the Y-direction so that a retrieval distance in the Y-direction between IML labels in the first position is different from a printing distance in the Y-direction between two adjacent IML labels in the label web, wherein a delivery distance between delivered IML labels in the second position in the Y-direction is bigger than the printing distance in the Y-direction between two adjacent IML labels in the web and is the same as the retrieval distance in the Y-direction between IML labels in the first position, wherein the unrolling device exposes the IML labels with a predetermined distance between the IML labels in the Y-direction, along a longitudinal extension of the label web, which is a different distance in the Y-direction than an existing distance between adjacent IML labels in the label web, by feeding the label web with pre-stamped IML labels through the unrolling device and wherein the transfer device retrieves the IML labels from the label web with the aid of the at least four holders, in the first position, with the IML labels at the first distance between them in the X-direction, across the longitudinal extension of the label web, which at least four holders move the IML labels to the second position for delivery of the IML labels to the label handling system, wherein the second distance between the IML labels is different from the first distance in the first position in the X-direction.

12. The method according to claim 11, in which the second distance between delivered IML labels in the second position in the X-direction, across the longitudinal extension of the label web, is bigger than the first distance in the X-direction between IML labels retrieved in the first position.

13. The method according to claim 11, in which the second distance between delivered IML labels in the second position in the X-direction, across the longitudinal extension of the label web, is smaller than the first distance in the X-direction between IML labels retrieved in the first position.

14. An in mould labelling (IML) system comprising:
 an unrolling device having a label web having partially stamped out IML labels, the label web having a length extending in a Y-direction and a width extending in an X-direction; and
 a transfer device comprising:
  first and second uprights each having a longitudinal axis extending along a length thereof; and
  at least one holder attached to each of the first and second uprights and arranged orthogonally to the respective first and second uprights, each holder having a plate at an end thereof for retrieving one of the IML labels,
 wherein the first and second uprights are each rotatable about the respective longitudinal axis to move the holders from a first position where each plate retrieves the respective IML label from the label web to a second position where each plate delivers the respective IML label to a label handling system, and
 wherein when the holders are in the first position, the at least one holder on the first upright is spaced a first distance from the at least one holder on the second upright in the X-direction, and when the holders are in the second positon, the at least one holder on the first upright is spaced a second distance different from the first distance from the at least one holder on the second upright in the X-direction,
 wherein rotation of the first and second uprights about the longitudinal axis affects rotation of the holders such that the holders are rotatable 180 degrees from the first position to the second position to deliver the IML labels to the label handling system, and
 wherein a delivery distance between delivered IML labels in the second position in the Y-direction is bigger than a printing distance in the Y-direction between two adjacent IML labels in the web and is the same as a retrieval distance in the Y-direction between IML labels in the first position.

15. The IML system according to claim 14, wherein each holder includes an extension to which the plate is attached, the extensions configured to move the plates from a retraced position to an extended position, wherein the plates are in the extended position when the labels are retrieved and delivered.

16. The IML system according to claim 14, wherein the second distance in the X-direction is greater than the first distance.

\* \* \* \* \*